United States Patent [19]

Bugman

[11] 4,039,219
[45] Aug. 2, 1977

[54] AUTOMATIC SAFETY LATCH LIFT HOOK UNIT

[75] Inventor: Michael Bugman, Ilion, N.Y.

[73] Assignee: Chicago Pneumatic Tool Company, New York, N.Y.

[21] Appl. No.: 698,881

[22] Filed: June 23, 1976

[51] Int. Cl.² ............................................. B66C 1/36
[52] U.S. Cl. .............................. 294/82 R; 24/241 PL; 24/242
[58] Field of Search .............. 294/83 R, 82 R, 78 R; 24/230.5 R, 230.5 AC, 230.5 S, 230.5 SS, 230.5 SA, 232, 233, 234, 235, 236, 237, 238, 239, 241 R, 241 PL, 241 P, 241 PP, 241 TC, 241 SB, 241 CH, 241 SL, 242

[56] References Cited

U.S. PATENT DOCUMENTS

| 1,545,377 | 7/1925 | Westmoreland | 24/233 |
| 3,008,210 | 11/1961 | Stovern | 24/235 |
| 3,811,158 | 5/1974 | Merser | 24/239 |

OTHER PUBLICATIONS

Engineering News, June 17, 1915.

*Primary Examiner*—James B. Marbert
*Attorney, Agent, or Firm*—Stephen J. Rudy

[57] ABSTRACT

A lift hook unit is described having a hook element swiveled to a supporting yoke; the hook element has a safety latch which is automatically movable from a normal open position to a closed position upon loading of the hook and is automatically returnable to open condition upon relaxing the load. A manual handle enables manual movement and guidance of the hook element in various directions as needed.

11 Claims, 4 Drawing Figures

U.S. Patent    Aug. 2, 1977    4,039,219
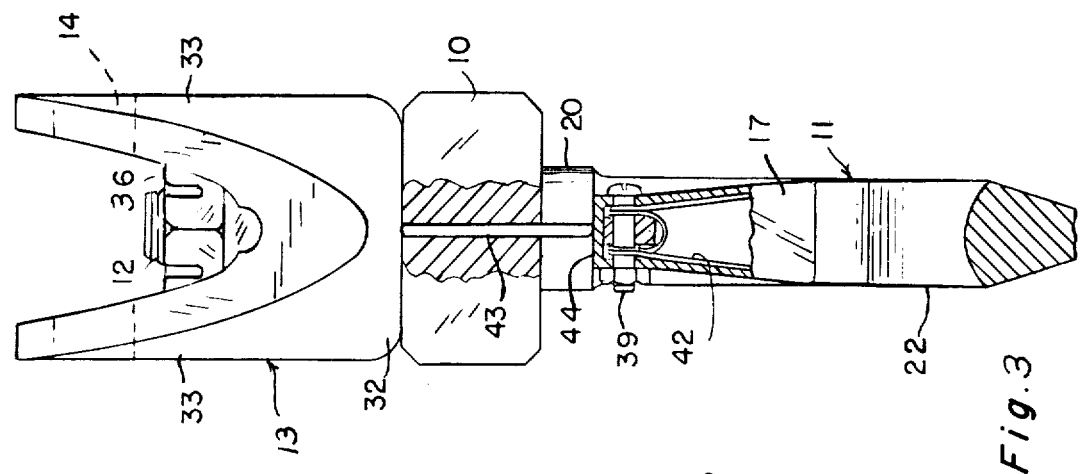
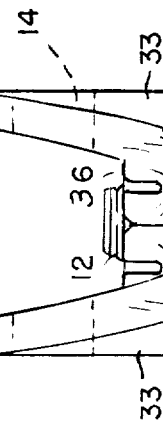
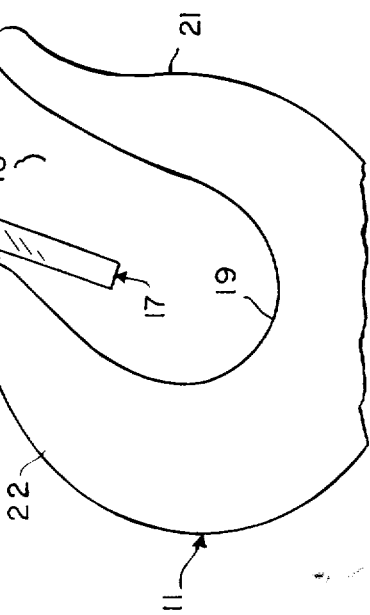
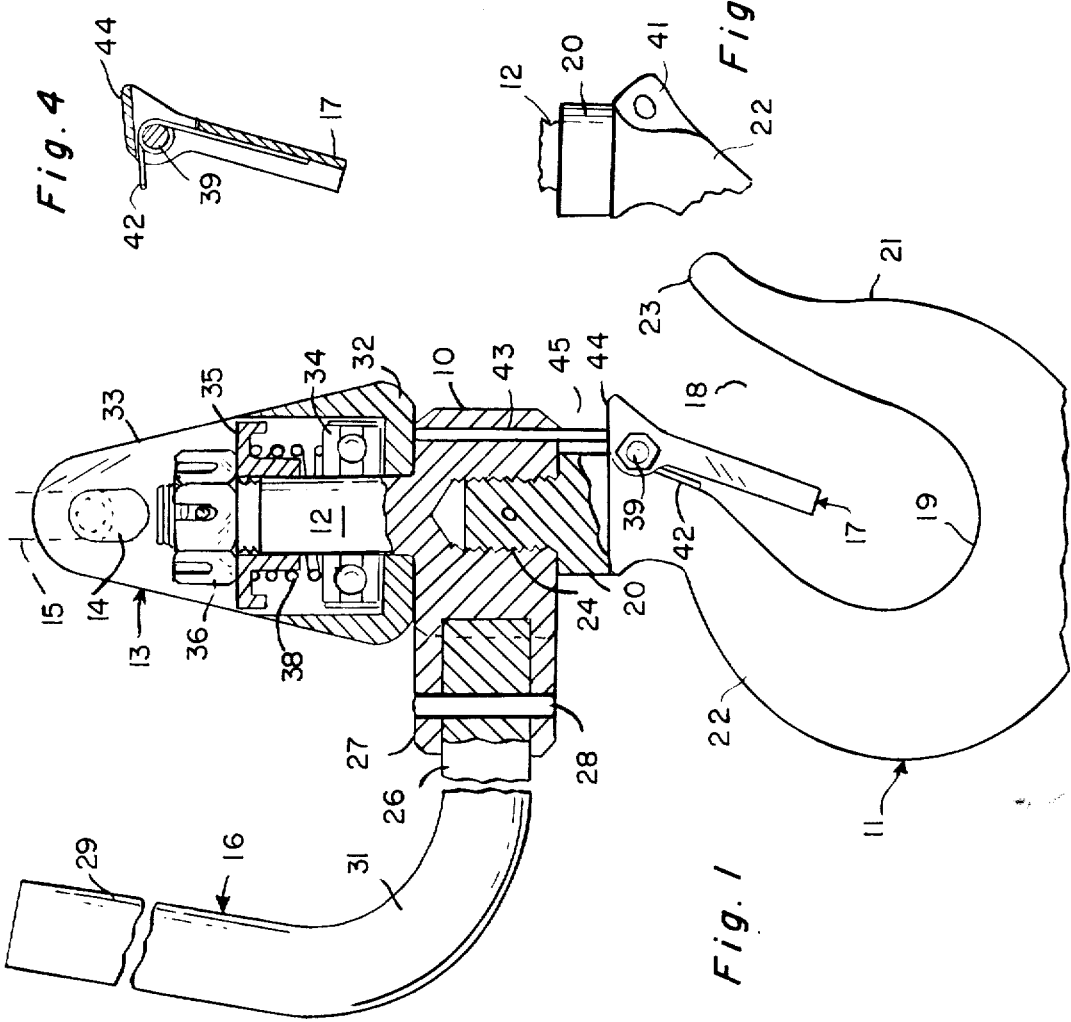

AUTOMATIC SAFETY LATCH LIFT HOOK UNIT

BACKGROUND OF THE INVENTION

This invention relates to lift hook units of a type having a safety latch to retain a work load on the hook against accidental escape.

A general object of this invention is to provide an improved hook unit of this nature.

A feature of the hook unit of the present invention is an organized arrangement of cooperable elements whereby a normally open safety latch is adapted to automatically close when the hook is loaded and is adapted to automatically return to open condition when the load is relaxed.

Another feature of the hook unit of the present invention lies in the particular arrangement of the hook element with a yoke element whereby the hook element is adapted to be swiveled relative to the yoke element.

A further feature of the hook unit is a handle of a desirable configuration whereby the unit may be manually moved and guided in a practical manner in various directions as needed.

In accordance with the invention there is provided a safety latch lift hook having a load receiving throat, a latch pivotable across the throat to open and closed positions, a spring biasing the latch to its closed position, plunger means having cooperation with the latch in response to unloading of the hook to pivot the latch against the bias of the spring to open position and to restrain the latch in the open position against the bias of the spring, and means responsive to loading of the hook to release the restraint of the plunger means from the latch so as to allow the latch to pivot under the spring bias to closed position.

BRIEF DESCRIPTION OF THE DRAWING

In the accompanying drawing:

FIG. 1 is a side elevational view partially in section showing an automatic safety latch lift hook unit embodying the invention;

FIG. 2 is a detail illustrating the pivot ear portion of the hook;

FIG. 3 is a front or right end elevational view of FIG. 1 with portions of the block and latch broken away; and FIG. 4 is a detail in vertical section of the latch.

DESCRIPTION OF A PREFERRED EMBODIMENT

Reference is now directed to the accompanying drawing wherein the safety latch lift hook unit illustrating an embodiment of the invention is shown as having a supporting base or block 10 from the underside of which depends a hook element 11. A spindle 12 projecting upwardly from the upper side of the block is swiveled in a yoke 13. The latter is provided with an eye 14 engaged by a terminal end, such as a stud, of a lift chain or cable 15. Normally, the cable will be suspended from an overhead support such as a trolley or a crane. A handle 16 projecting from the block is adapted to be manually grasped for positioning the hook unit as needed for reception or removal of a work load. A safety latch 17 associated with the hook element is automatically operable to close or open the throat 18 of the hook accordingly as the hook becomes loaded or unloaded.

The hook element 11 has a lower curved portion or saddle 19 from which extends upwardly a pair of laterally spaced arms 21, 22 to define the throat 18 between them. Arm 21 defines at its upper end a rounded tip 23 over which the eye end or a looped cable of the load is passed into the throat of the hook. Arm 22 terminates in an offset upright portion 20 defining a mounting shank for the hook. The shank has a threaded connection 24 in block 10. A pin rigidly secures the shank to the block against relative turning.

The handle 16 is shown here as a cylindrical rod of substantially right angular configuration. One arm 26 of the handle extends laterally from a side extension 27 of block 10; and it is fixed to the latter by a pin 28 against relative turning. The other arm 29 of the handle extends upwardly from a curved juncture 31 with arm 26. This construction provides an advantageous handle whereby substantially universal movement of the hook 11 and the load which it carries may be made. Accordingly as either the lateral arm 26, the curved portion 31, or the upright arm 29 is manually grasped and directionally forced, the hook 11 may be moved, swiveled, tilted, and directionally guided.

The yoke member 13 includes a thickened annular base 32 from which upwardly extends a pair of laterally spaced arms 33. Holes in the upper ends of the arms define the eye 14 for reception of a terminal of the supporting cable.

The spindle portion 12 of block 10 is elongated. It passes slidably, in order, through the yoke base, a bearing 34 and a bushing 35. It is prevented from pulling free of the yoke by means of a retaining nut 36 threaded upon its upper end and abutting an upper radial flange of the bushing 35. A spring load 38 between the flange and the bearing biases the bearing to seated relation with the base of the yoke. The spring load acts through the bushing and nut to bias the spindle upwardly into the yoke so that the upper flat surface of block 10 is drawn into abutment with the flat undersurface of the yoke in an unloaded or normal condition of the hook, as in FIG. 1.

It can be seen that, while the yoke is being held by the supporting cable and a weight sufficient to overcome the resistance of spring 38 is loaded upon the saddle 19 of the hook, the bushing 35 will be drawn downward by the spindle into bearing relation with the upper race of bearing 34; and the upper surface of block 10 will be drawn a corresponding distance downward and clear of the undersurface of the yoke. In this condition, the block may be readily swiveled with the loaded hook relative to the yoke. And, when the load on the hook is removed or relaxed, spring 38 will return the block and the attached hook upwardly to normal position.

A work load is caused to be supported on the hook by passing the usual eye or looped cable of the load over the rounded end 23 of the hook and down through the throat 18 onto the saddle 19. To prevent the load from accidentally escaping free of the hook, the latch 17 is provided.

The latch is pivoted upon a pin 39 which extends transversely through an ear 41 of the shank portion of the hook.

A torsion spring 42 coiled about the pivot pin 39 constantly biases the latch arm angularly in a closing direction across the throat 18 into abutment with arm 21 of the hook.

In the unloaded or normal condition of the hook, the latch arm depends inwardly of the throat 18 of the hook to a position in which the throat is open to entry or removal of a work load. The latch is normally held in this open condition against the bias of its closing spring 42 by means of a pressurized push rod 43.

The push rod is slidably disposed in a vertical hole opening through opposite faces of block 10. It is cooperable with an ear 44 offset from the upper end of the latch to pivot the latch to its open position. In the unloaded condition of the hook the push rod obtains the position shown in FIG. 1. In this position the lower end of the rod projects, under pressure of the spring loaded yoke acting over the upper end of the rod, through a space 45 at the underside of the block into pressed abutment with a flat surface of the latch ear, forcing the latter to pivot the latch arm to its open condition. When a work load is placed upon the hook, it will pull the block 10 downward from the stationary supported yoke against the resistance of the yoke spring 38. This relaxes and releases the downward pressure of the yoke from the push rod and permits the latch spring 42 to pivot the latch to closed position across the throat. As the latch is pivoted to closed position its ear 44 is carried angularly upward in the space 45 and cams the push rod 43 upwardly against the underside of the yoke.

It is to be noted that the latch is relatively longer than the cross dimension of the throat 18 of the hook, so that in closed position it will abut angularly and downward against the arm of the hook. Accordingly, it cannot be forced upwardly clear of the tip of the hook.

The push rod 43 is at all times in abutting end relation with both the base of the yoke and the ear 44 of the latch, since it is constantly urged downward by the load of the yoke spring 38 and upwardly by the bias of the latch spring. It is to be noted that the extent to which the push rod will be cammed upwardly following loading of the hook is determined by the distance that the block 10 can move downwardly relative to the base of the yoke. This upward movement of the push rod and corresponding downward movement of the block must be sufficient to prevent the push rod from blocking pivoting of the latch to its fully closed position. To ensure this, nut 36 may be adjusted as needed along the spindle to increase or decrease the space normally existing between the bushing 35 and bearing 34. The nut is preferably of a castellated type having an associated locking pin, whereby the nut may be locked in its adjusted position.

I claim:

1. A safety latch lift hook having a load receiving throat, a latch pivotable across the throat to open and closed positions, a spring biasing the latch to its closed position, plunger means having cooperation with the latch in response to unloading of the hook to pivot the latch against the bias of the spring to open position and to restrain the latch in the open position against the bias of the spring, and means intergral with the lift hook and responsive to loading of the hook to release the restraint of the plunger means from the latch so as to allow the latch to pivot under the spring bias to closed position.

2. A safety latch lift hook comprising a supporting yoke, a block having an axial sliding connection with the yoke, a hook having a shank arm fixed to the block and having a throat for reception of a load onto the hook, a latch supported on the shank arm pivotable across the throat to open and closed positions, a spring biasing the latch to closed position, blocking means normally restraining the latch in the open condition and from pivotaing under the bias of the spring to closed position in an unloaded condition of the hook, and means integral with the lift hook and having response to the hook obtaining a loaded condition to disable the blocking means from restraining the latch from pivoting under the bias of the spring to closed position.

3. A safety latch lift hook as in claim 2, wherein the block is rotatable relative to the yoke, and a handle is attached to the block for applying a swiveling force upon the hook relative to the yoke.

4. A safety latch lift hook unit comprising a yoke support having a base, a block underlying the base having an upstanding spindle supported in the yoke for relative axial sliding movement, a spring load biasing the spindle and block upwardly relative to the yoke to abut the block against the base, a hook depending from an underside of the block having a throat for reception of a load upon the hook, a latch pivotable on the hook to open and closed conditions relative to the throat, a torsion spring biasing te latch about its pivot to closed condition, the latch having an offset ear adapted under a downwardly applied pressure thereon to pivot the latch against the bias of the torsion spring to open condition and adapted when relaxed of said pressure to allow the torsion spring to pivot the latch to closed condition, a push rod extending slidably through the block having a lower end projecting from the block abutting upon the ear and having an upper end abutting the base of the yoke, the spring load exerting through its upward bias on the block a downward pressure by the base of the yoke upon the push rod overcoming the bias of the torsion spring on the latch in an unloaded condition of the hook, the block being adapted to be drawn downwardly relative to the yoke against the bias of the spring load upon the hook obtaining a loaded condition and the push rod obtaining a relaxed pressure condition relative to the ear of the latch as a consequence permitting the torsion spring to pivot the latch to closed condition.

5. A safety latch lift hook unit as in claim 4, wherein the spindle also has rotatable movement relative to the yoke.

6. A safety latch lift hook unit as in claim 5, wherein a handle is attached to the block permitting manual application of variously directed forces selectively to the unit.

7. A safety latch lift hook unit as in claim 6, wherein the handle is of right angular configuration.

8. A safety latch lift hook unit as in claim 4, wherein the hook has a threaded connection of a shank portion thereof with the block.

9. A safety latch lift hook unit as in claim 4, wherein means is provided for controlling the extend to which the block may be drawn downwardly relative to the yoke.

10. A safety latch hook unit as in claim 9, wherein means is provided for selectively adjusting the value of the spring load on the spindle.

11. A safety latch hook unit as in claim 10, wherein the means for selectively adjusting the value of the spring load is a nut threaded upon the spindle having means for locking it in its adjusted position.

* * * * *